(12) United States Patent
Ryu

(10) Patent No.: US 8,322,262 B2
(45) Date of Patent: Dec. 4, 2012

(54) CARTRIDGE FOR AN EDIBLE FILM DISPENSER

(76) Inventor: Gi-Je Ryu, Gyeonggi-do (KR)

( * ) Notice: Subject to any disclaimer, the term of this patent is extended or adjusted under 35 U.S.C. 154(b) by 873 days.

(21) Appl. No.: 12/301,974

(22) PCT Filed: May 25, 2007

(86) PCT No.: PCT/KR2007/002543
§ 371 (c)(1),
(2), (4) Date: Nov. 21, 2008

(87) PCT Pub. No.: WO2007/136235
PCT Pub. Date: Nov. 29, 2007

(65) Prior Publication Data
US 2010/0297312 A1      Nov. 25, 2010

(30) Foreign Application Priority Data

May 24, 2006   (KR) .................. 10-2006-0046763

(51) Int. Cl.
*B26D 7/00* (2006.01)
*G03B 23/02* (2006.01)
*G11B 23/107* (2006.01)
*B65D 85/02* (2006.01)
*B65H 16/00* (2006.01)
*G07F 11/72* (2006.01)

(52) U.S. Cl. ............. 83/649; 242/348; 242/588; 221/30

(58) Field of Classification Search ............ 83/648–650; 242/348, 348.1, 348.2, 348.4, 588, 588.3, 242/588.5, 588.6; 220/612, 678; 221/30; B26D 1/00, 5/00; B65H 75/32, 35/08

See application file for complete search history.

(56) References Cited

U.S. PATENT DOCUMENTS

| | | | | |
|---|---|---|---|---|
| 2,291,668 | A * | 8/1942 | Weigolt | 83/522.21 |
| RE22,945 | E * | 12/1947 | Engberg | 83/78 |
| 3,236,427 | A * | 2/1966 | Martin | 225/96 |
| 4,139,311 | A * | 2/1979 | Lorscheidt | 401/55 |
| 4,151,039 | A * | 4/1979 | Lash | 156/767 |
| 4,718,971 | A * | 1/1988 | Summers | 156/540 |
| 4,993,586 | A * | 2/1991 | Taulbee et al. | 221/25 |
| 5,310,128 | A * | 5/1994 | Doeberl et al. | 242/591 |
| 5,472,560 | A * | 12/1995 | Horng | 156/577 |
| 5,685,944 | A * | 11/1997 | Nose et al. | 156/540 |
| 5,851,348 | A * | 12/1998 | Muenzer et al. | 156/577 |
| 6,439,289 | B1 * | 8/2002 | Schlotthauer | 156/539 |
| 6,453,968 | B1 * | 9/2002 | Hsu | 156/577 |
| 7,121,499 | B2 * | 10/2006 | Lammers et al. | 242/588.6 |
| 7,540,225 | B2 * | 6/2009 | Lee | 83/649 |
| 2004/0043134 | A1 * | 3/2004 | Corriveau et al. | 426/658 |
| 2004/0247744 | A1 * | 12/2004 | Pearce et al. | 426/72 |
| 2007/0122455 | A1 * | 5/2007 | Myers et al. | 424/439 |

FOREIGN PATENT DOCUMENTS

GB           2214898 A  *  9/1989

* cited by examiner

*Primary Examiner* — Ghassem Alie
*Assistant Examiner* — Bharat C Patel
(74) *Attorney, Agent, or Firm* — Frost Brown Todd LLC

(57) ABSTRACT

A cartridge for an edible film dispenser protects a mounted edible film having a roll form, enables easy mounting of the edible film in the edible film container, and simplifies the structure of the edible film dispenser. The cartridge includes an edible film tape, which has a cylindrical main bobbin and a cylindrical take-up bobbin, a cartridge body, which includes a main shaft, a draw shaft, a take-up shaft, and an edge perpendicular wall, which are spaced apart from each other, and a plate-like cartridge cover, which has a size and profile equal to those of the cartridge body.

7 Claims, 9 Drawing Sheets

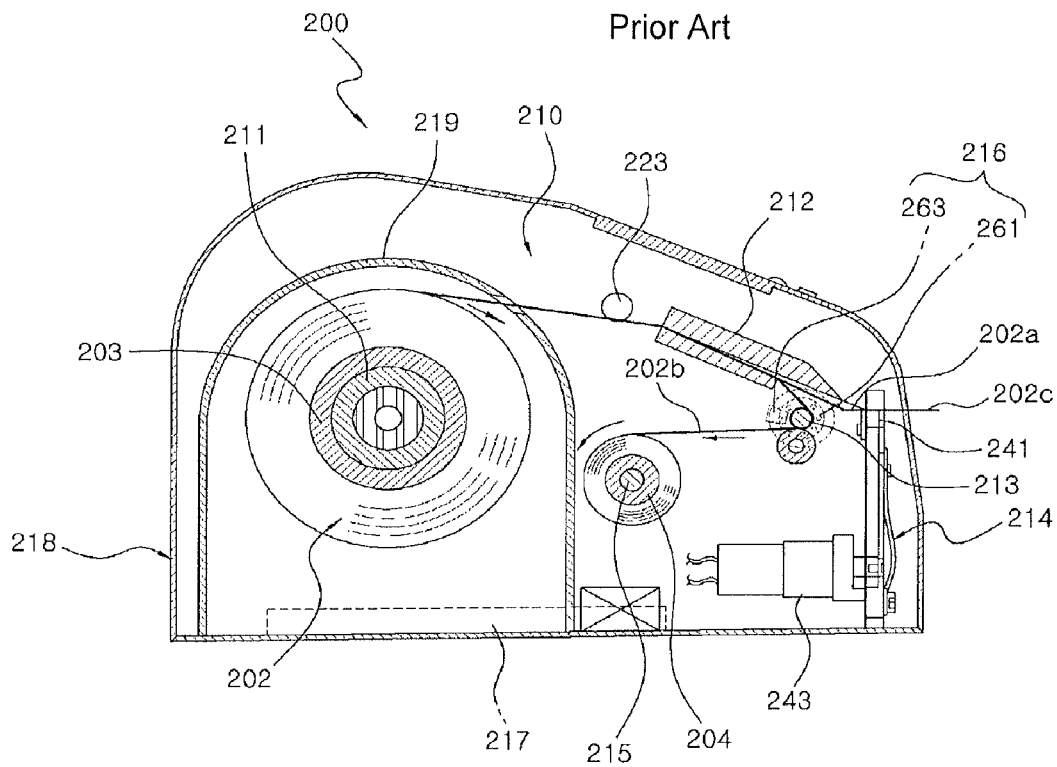
[Fig. 1] Prior Art
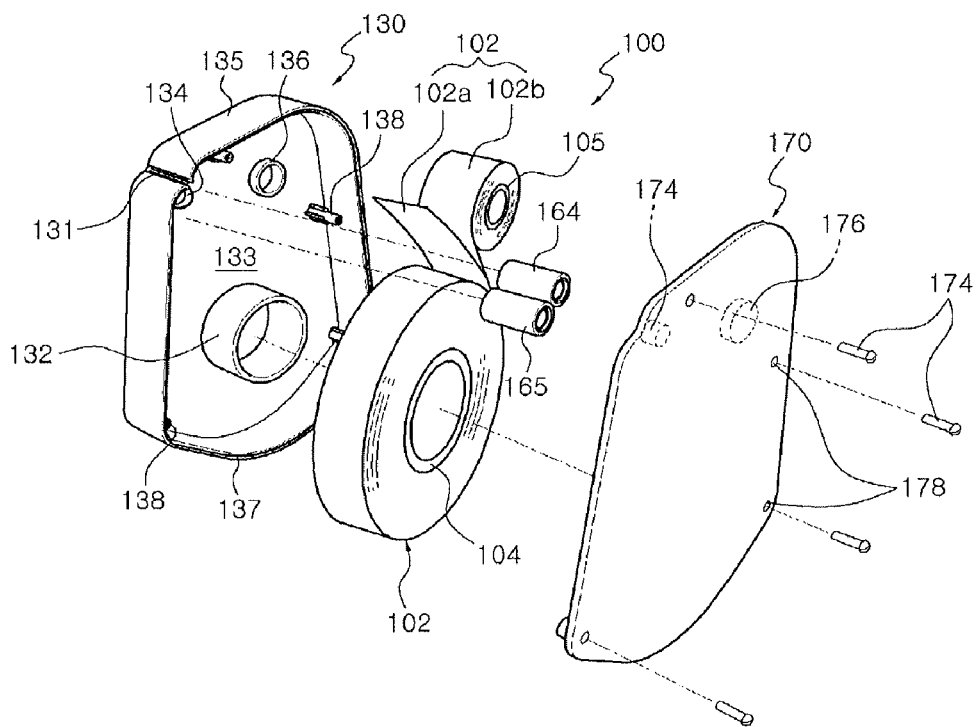
[Fig. 2]

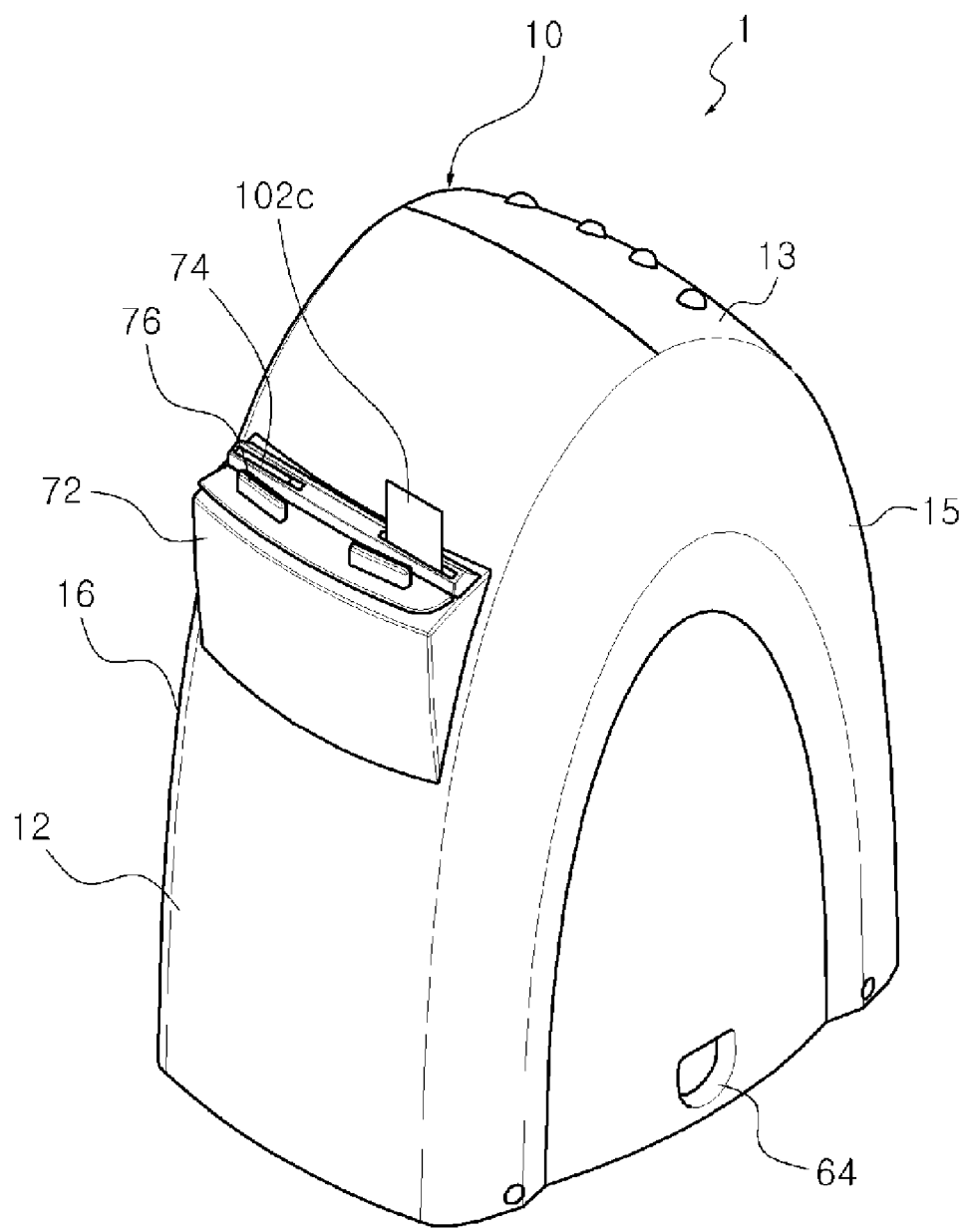
[Fig. 3]

[Fig. 4]
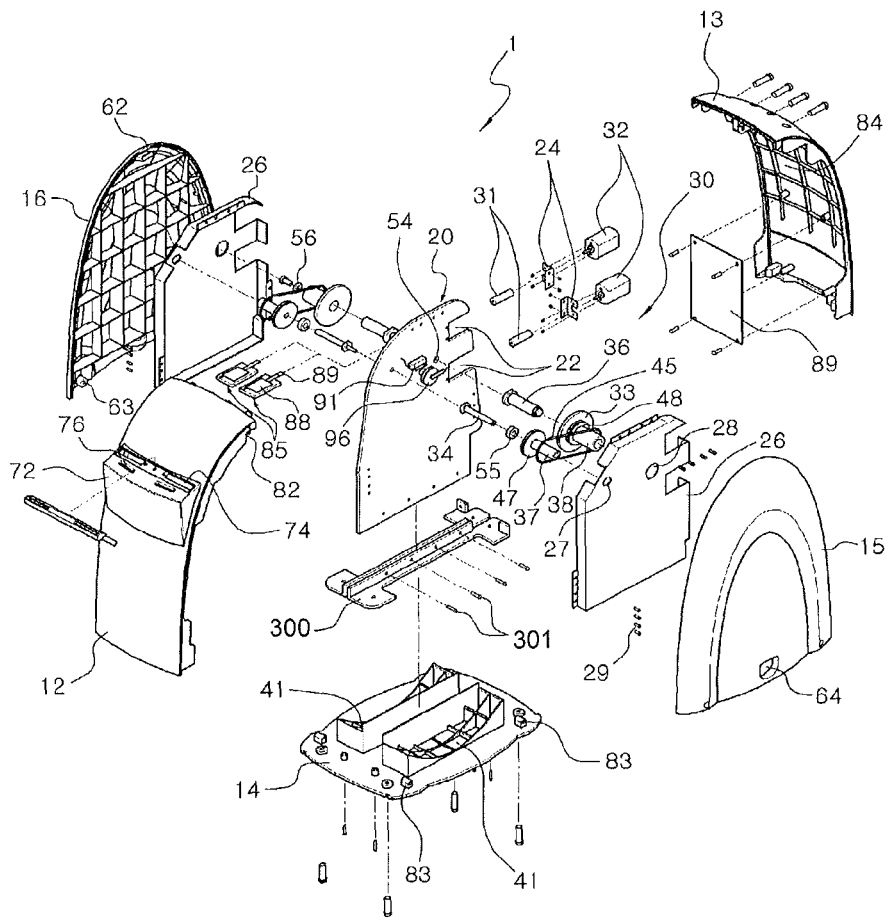
[Fig. 5]
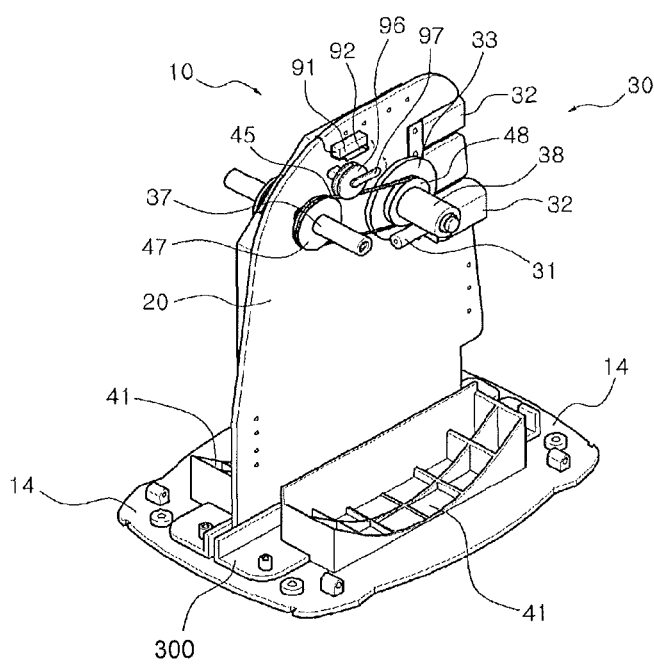

[Fig. 6]
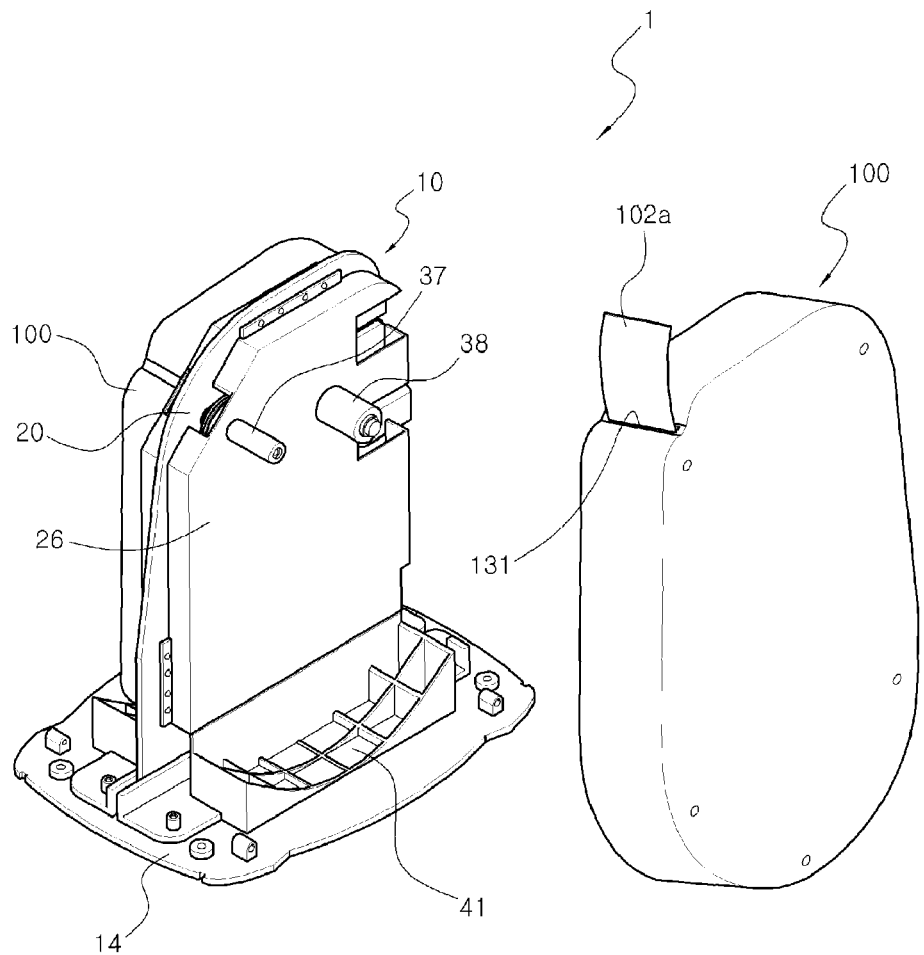
[Fig. 7]
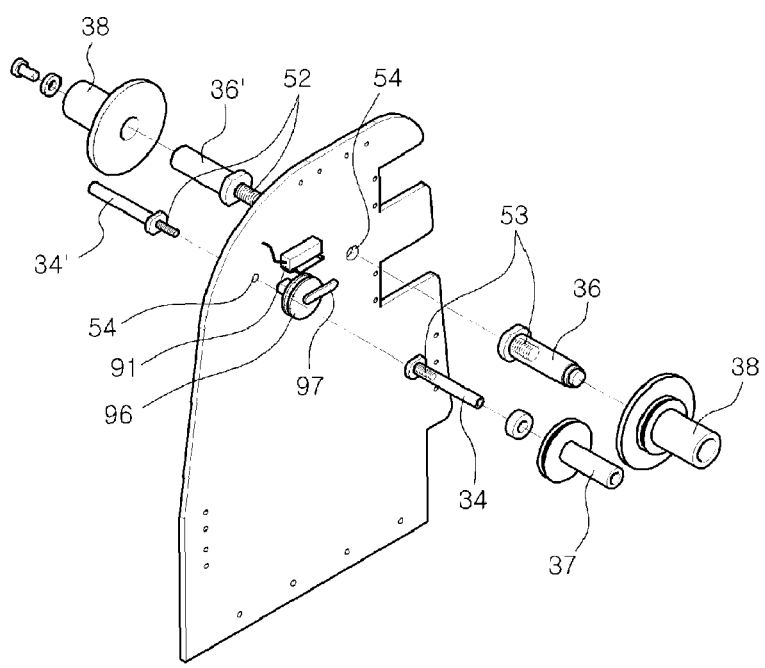

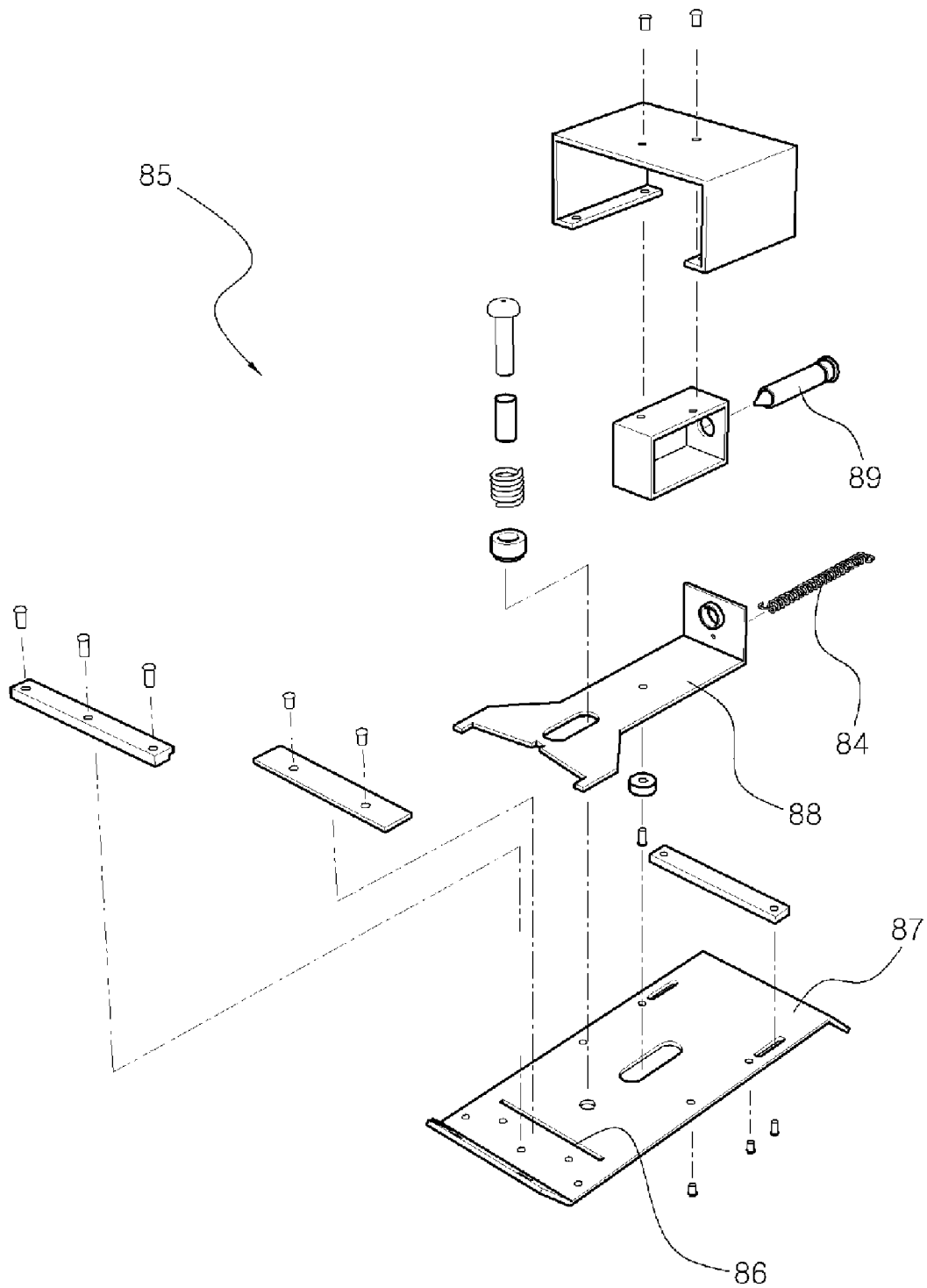
[Fig. 8]

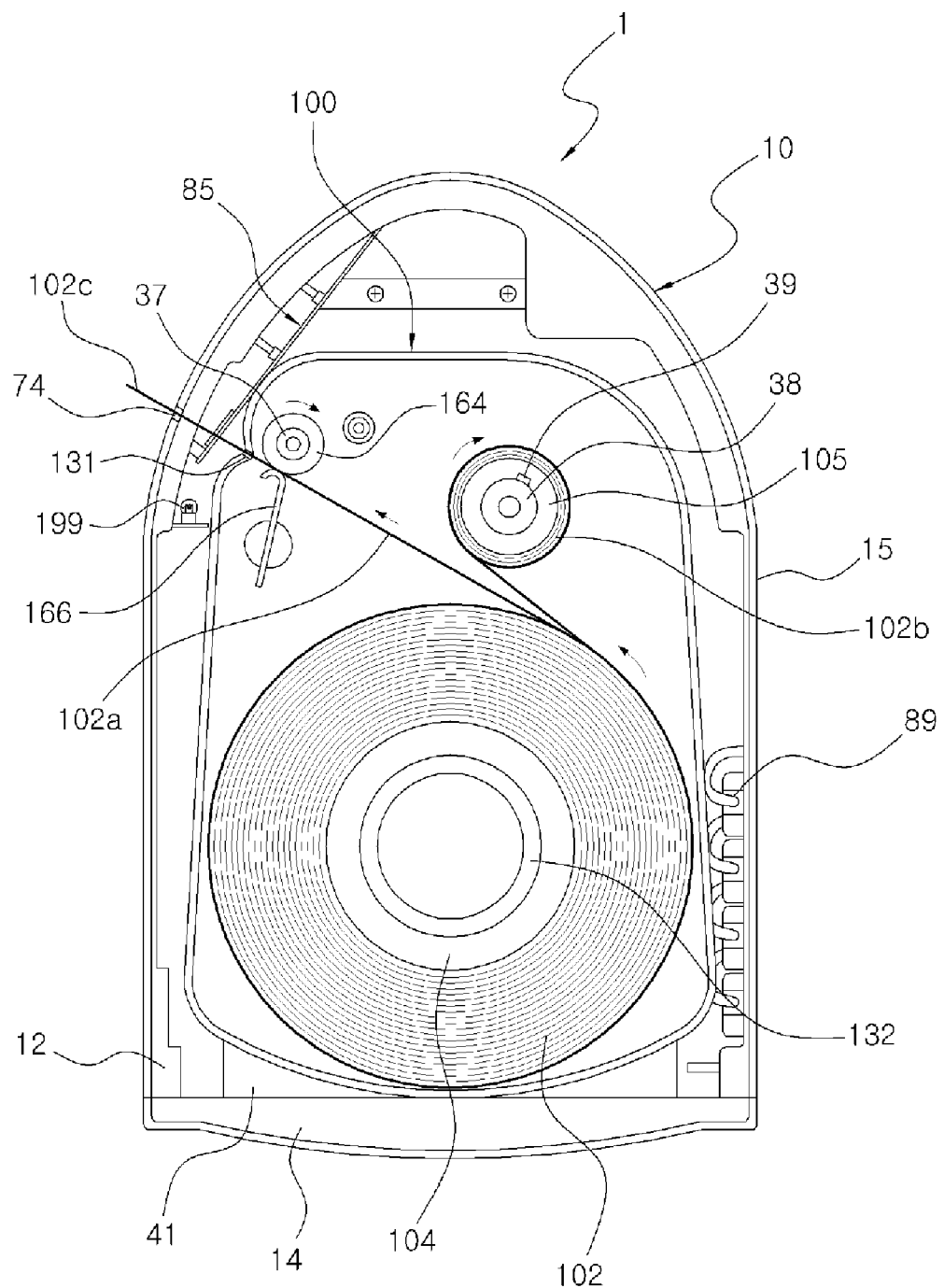
[Fig. 9]

[Fig. 10]
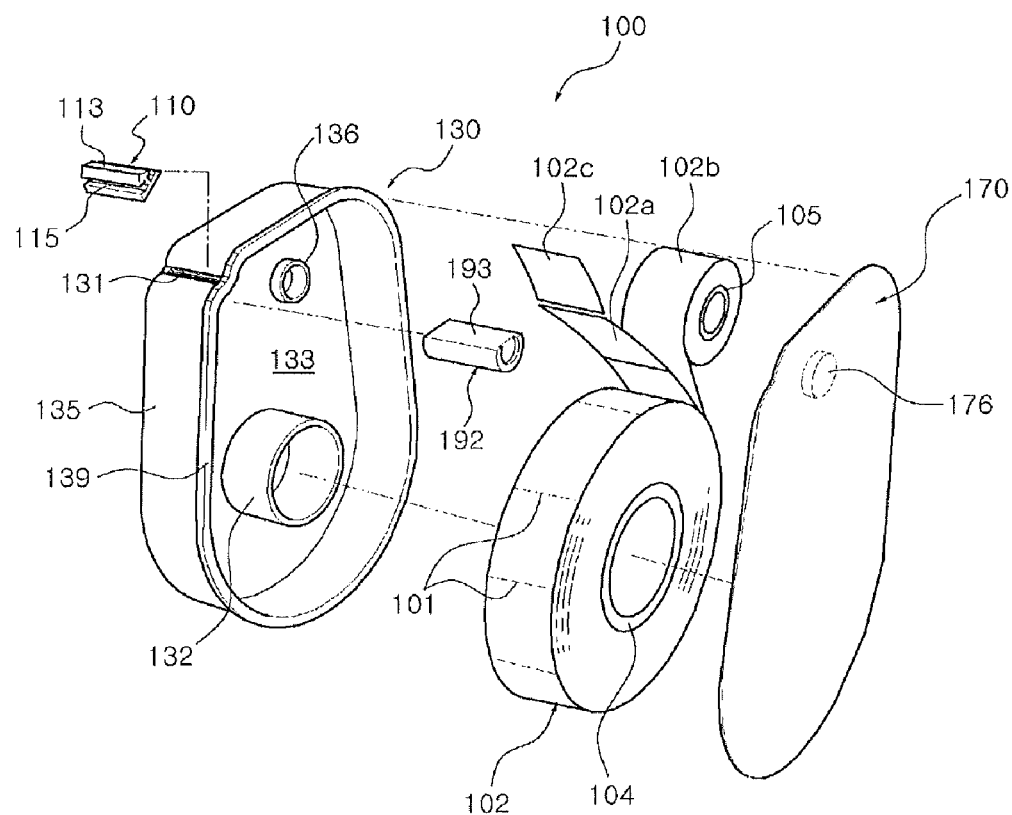
[Fig. 11]
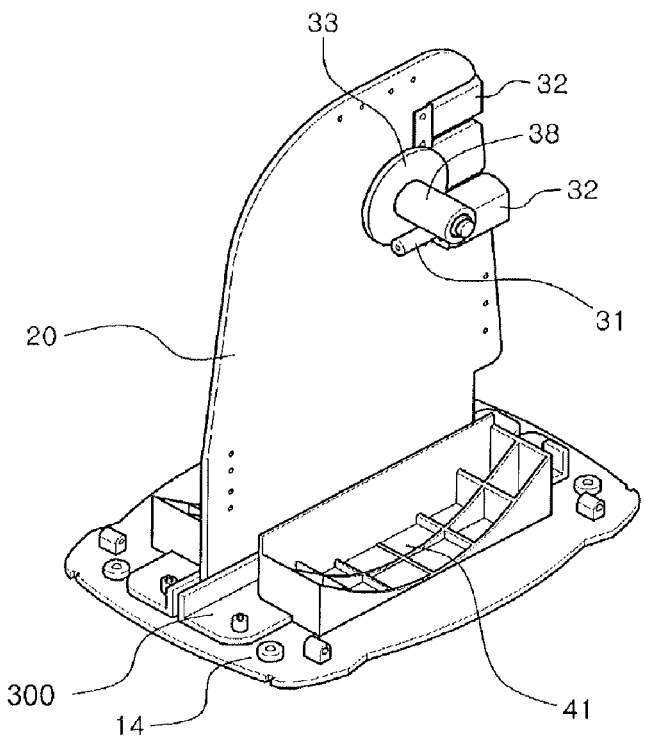

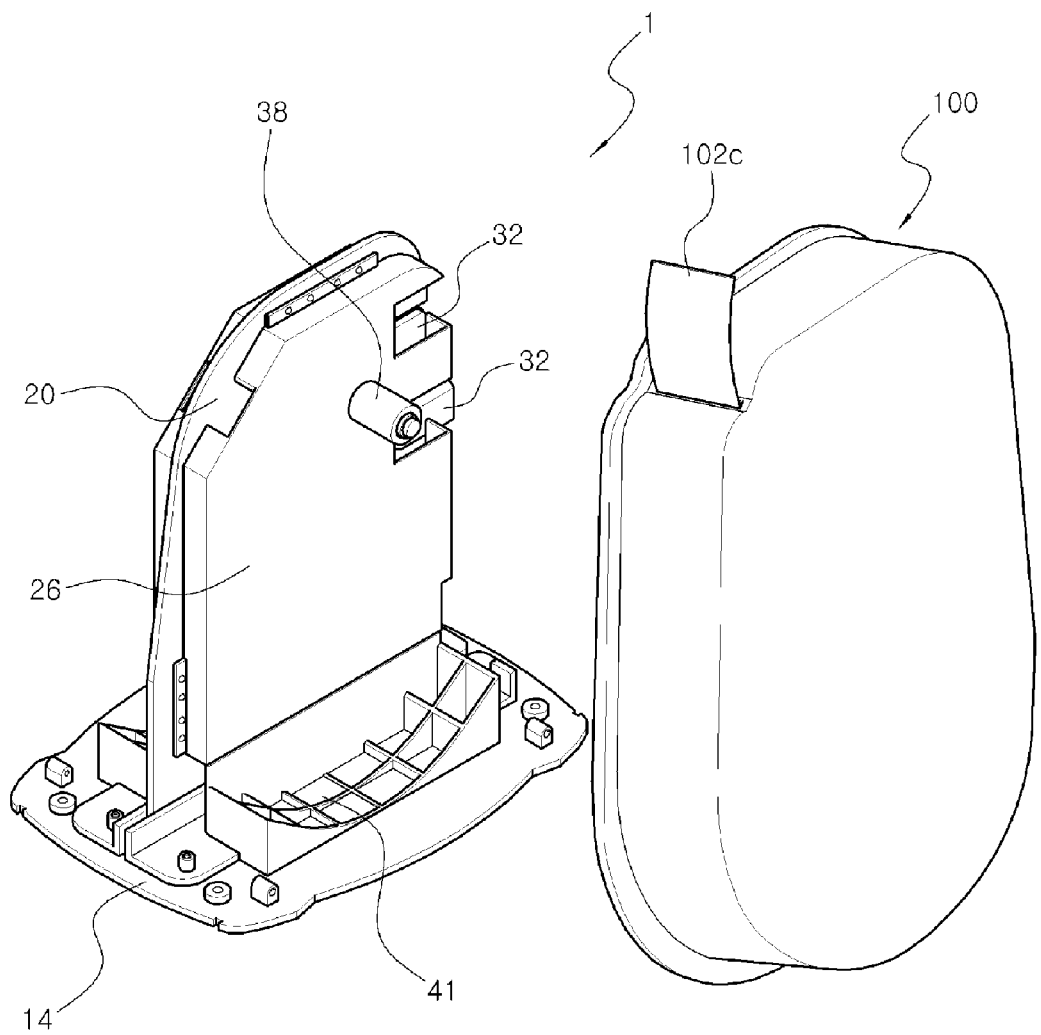

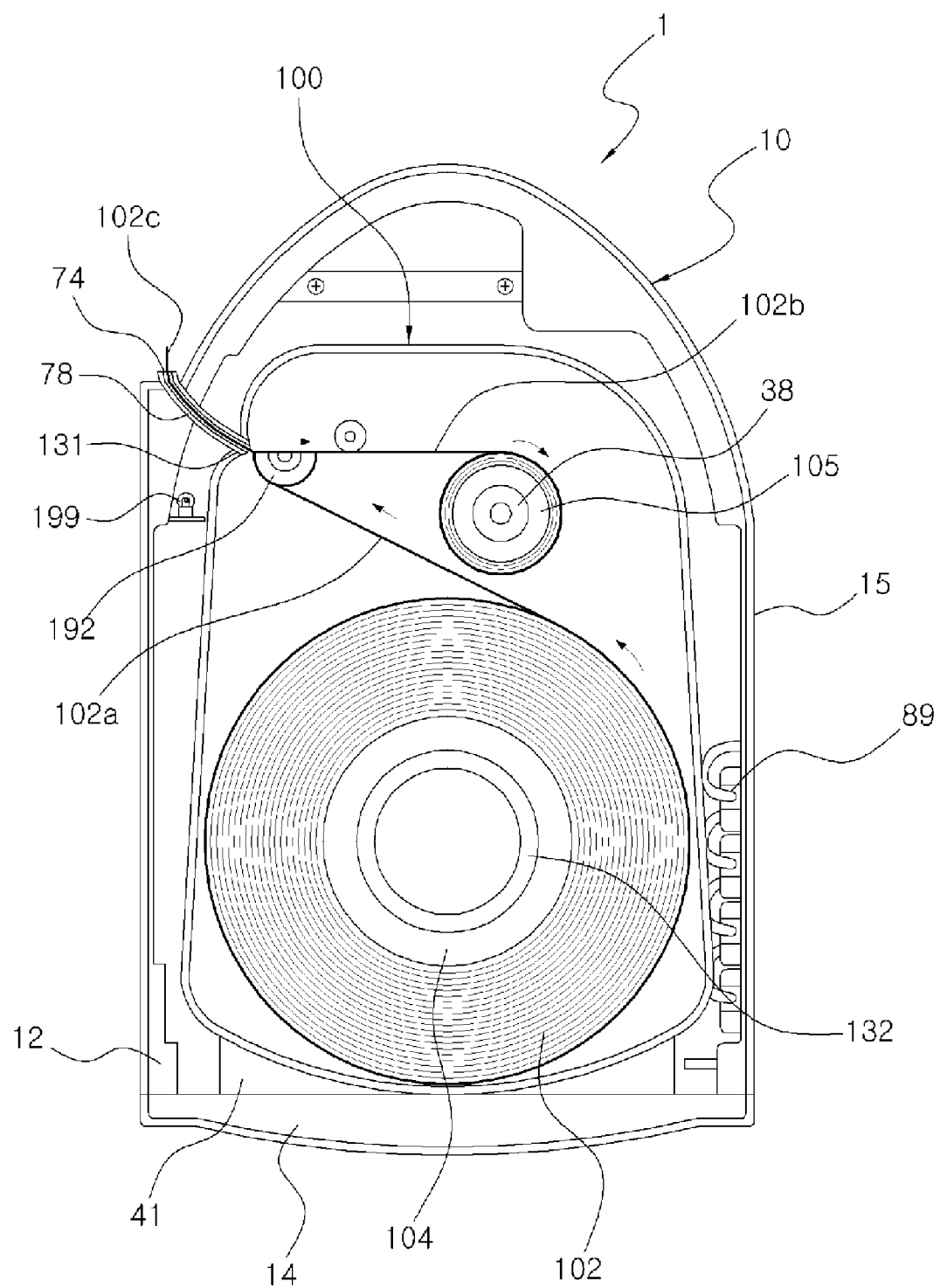
[Fig. 13]

CARTRIDGE FOR AN EDIBLE FILM DISPENSER

FIELD OF THE INVENTION

The present invention relates, in general, to a cartridge for an edible film dispenser, and more particularly to a cartridge for an edible film dispenser, capable of protecting a mounted edible film having a roll form, enabling easy mounting of the edible film in the edible film dispenser, and simplifying the structure of the edible film dispenser.

BACKGROUND

In general, edible films are produced in a thin film form by combining materials healthful to the human body with a raw material such as starch, which is not harmful to the human body and is readily dissolved in water, and are considered films fit to be eaten. These edible films allow healthful materials to be administered through the oral cavity or the skin. For example, in the event that any edible film is put into and dissolved in the mouth, the healthful materials can be easily administered into the human body. Further, these edible films make it possible to administer cosmetics or medicines through attachment to the skin, etc.

Recently, these edible films have been used for a breath freshener by adding materials for removing and preventing foul breath, providing fresh aromas, such as peppermint or menthol, and pigment. These edible films for the breath freshener can replace gum or candy, which have been broadly used to date in spite of the problem of environmental pollution or dental hygiene. Especially, the edible films for the breath freshener can be served for dessert at big restaurants, etc. where large quantities of gum or candy are provided to customers for dessert.

An instrument for storing these edible films, which are vulnerable to moisture and are produced in a thin film form, and then dispensing pieces of the edible film one by one is an edible film dispenser. This edible film dispenser is generally classified into a portable type and a desktop type. The portable type edible film dispenser is designed to hold a sheet-like edible film in a pocket-like box in the form of sheets that can be pulled out one by one when used. The desktop type edible film dispenser is designed to cut and discharge a roll of edible film, which is held in a dispenser on the front counter of a restaurant, in pieces of a predetermined size and to discharge them one by one when used.

The present invention is directed to such a desktop type edible film dispenser, which cuts an edible film wound in the form of a roll and dispenses pieces of the cut edible film one by one. This desktop type edible film dispenser can continuously dispense the edible film, so that it can be used in restaurants, hospitals, banks, etc. by many persons.

FIG. 1 is a sectional view illustrating an example of a related edible film dispenser. As illustrated, when the edible film dispenser 200 is switched on, an edible film tape 202 wound in the form of a roll is rotated to cause edible tape 202a to be drawn out. The drawn edible tape 202a is cut to a predetermined length, and thus is discharged as a piece of edible film 202c. Then, the piece of the discharged edible film 202c is pulled out by a user when used.

As illustrated, the related edible film dispenser 200 generally comprises the edible film tape 202, which is wound in the form of a roll, and a dispenser body 210, which discharges the edible film tape 202 mounted therein, cuts the drawn edible film tape 202 to a predetermined length, and dispenses the cut edible film tape 202.

The edible film tape 202 has the structure of a dual tape consisting of the edible tape 202a and a release paper tape 202b. One end of the edible film tape 202 is wound around a cylindrical main bobbin 203. In the dispenser body 210, a main shaft 211, on which the main bobbin 203 is supported, is spaced apart from a take-up shaft 215, on which a take-up bobbin 204, onto which the release paper tape 202b separated from the edible film tape 202 is wound, is supported. Further, a guide unit 212 for guiding the edible film tape 202, a separating shaft 213 for drawing out the edible film tape 202 and separating the release paper tape 202b from the edible tape 202a, a cutter unit 214 for cutting the edible tape 202a drawn out through the guide unit 212, and a drawn length sensor unit 216 having sensors 261 and 263 for sensing the rotation distance of the separating shaft 213 are installed between the main shaft 211 and the take-up shaft 215.

Thus, in order to set the edible film tape 202, wound in a roll form, for the related edible film dispenser 200, first, the edible film tape 202, wound in a roll form, is rotatably installed on the main shaft 211 formed in the dispenser body 210, particularly an inner case 219. The edible film tape 202, drawn out of the inner case 219, passes through the guide unit 212. Then, the edible tape 202a, separated at the separating shaft 213, passes through a through-slit 241 of the cutter unit 214 and is suspended, while the release paper tape 202b, separated from the edible film tape 202, is fixed on the outer circumference of the take-up bobbin 204 via the drawn length sensor unit 216.

In this manner, the edible file dispenser 200 according to the related art is designed to directly mount the edible film tape 202, wound in a roll form, on the dispenser body 210 without using the cartridge. As such, the setting of the edible film tape 202 takes a lot of time and requires skill. The edible film tape 202, which is vulnerable to moisture, is damaged if it is exposed to moisture flowing into the dispenser body 210.

Because it takes a lot of time to set the edible film tape 202, the edible film tape 202 may not be set at a busy time, such as lunchtime or dinnertime, at the desired time, thus creating dissatisfied customers. Thus, this complicated setting work is responsible for discouraging the use of the edible film dispenser 200 in restaurants. Further, the related edible film dispenser 200 does not use the cartridge for protection against moisture, so that the edible tape is damaged by the moisture or is contaminated by foreign materials or microorganisms. Furthermore, the edible tape, damaged by the moisture, sticks fast to the release paper tape, and thus is not discharged.

In addition, the related edible film dispenser 200 has a large bottom area, so that it is in difficult to install in a narrow place such as a counter table. In other words, the related edible film dispenser 200 has a structure in which the take-up shaft 215, the guide unit 212, the separating shaft 213, a driver unit 243, etc. are installed at the front of the edible film tape 202, which is wound in a roll form, so that the dispenser body 210 is disposed in a horizontal direction. Thus, the bottom area of the dispenser body 210 is wide, and the arrangement of parts is not compact. Consequently, the related edible film dispenser 200 requires a separate table dedicated thereto.

These problems usually make it difficult to distribute the edible film dispenser 200, and the failure to popularize the edible film dispenser 200 is attributed thereto. The inventor of the present invention devised a new type of edible film dispenser capable of solving these problems, as well as a cartridge for dispensing the edible film.

BRIEF SUMMARY OF THE INVENTION

Accordingly, the present invention has been made keeping in mind the above problems occurring in the prior art, and an object of the present invention is to provide an edible film cartridge, capable of preventing a roll-type edible film tape received therein, from being damaged by moisture, and rapidly and easily mounting and setting the edible film tape on an edible film dispenser.

It is another object of the present invention to provide an edible film cartridge, in which an edible film tape having a main bobbin and a take-up bobbin is received in the edible film cartridge, and which only edible tape separated and drawn from the edible film tape is drawn out of the edible film cartridge, and which the work of setting the edible film tape is completed when the edible film cartridge is mounted in a dispenser body, thereby realizing easy maintenance and enabling an unskilled person to easily use it.

It is yet another object of the present invention to provide an edible film cartridge, in which an edible film tape having edible tapes pre-cut to a constant length wound in a double tape form is received into the edible film cartridge having a separating pin, thereby simplifying the driver unit of a dispenser body and eliminating the cutter unit and an encoder unit, thus lowering the cost of a product.

In order to accomplish the above object, according to an aspect of the present invention, there is provided an edible film cartridge which is mounted in an edible film dispenser which dispenses pieces of edible film one by one. The edible film cartridge comprises:

an edible film tape, which is wound in a roll form, and which includes a cylindrical main bobbin, around which an edible film tape, which has an edible tape and a release paper tape having a predetermined length adhered in a double tape form, is wound, and a cylindrical take-up bobbin, around which the release paper tape, separated from the edible film tape, is wound in a roll form;

a cartridge body, which includes a main shaft, to which the cylindrical main bobbin, around which the edible film tape wound in the roll form is wound, is rotatably coupled, a draw shaft, to which a draw roller, which discharges edible tape separated from the edible film tape, is rotatably coupled, a take-up shaft, to which the cylindrical take-up bobbin, around which the release paper tape separated from the edible film tape is wound, is rotatably coupled, and an edge perpendicular wall that is formed along an edge thereof at a predetermined height such that the edible film tape wound in the roll form is rotatably received and that has a draw slit through which the edible film tape, drawn out by the draw roller, is discharged, wherein the main shaft, the draw shaft, and the take-up shaft are spaced apart from each other when installed; and a plate-like cartridge cover, which has a size and profile equal to those of the cartridge body so as to be closely coupled with the top surface of the edge perpendicular wall of the cartridge body.

According to another aspect of the present invention, an edible film cartridge, which is mounted in an edible film dispenser dispensing pieces of edible film one by one, comprises:

an edible film tape, which includes a cylindrical main bobbin, around which an edible film tape, in which pieces of edible tape pre-cut to a constant length are adhered to one surface of a release paper tape in a row, is wound, and a cylindrical take-up bobbin, around which the release paper tape, separated from the edible film tape, is wound in a roll form;

a cartridge body, which includes a main shaft to which the cylindrical main bobbin, around which the edible film tape is wound, is rotatably coupled, a separating pin, which has an edge so as to separate the edible tapes, pre-cut to the constant length, from the release paper tape of the edible film tape, a take-up shaft to which the cylindrical take-up bobbin, around which the release paper tape separated from the edible film tape is wound, is rotatably coupled, and an edge perpendicular wall, which is formed along an edge thereof at a predetermined height such that the edible film tape wound in the roll form is rotatably received and which has a draw slit through which the edible tape separated by the separating pin is discharged, wherein the main shaft, the separating pin, and the take-up shaft are spaced apart from each other when installed; and a plate-like cartridge cover, which has a size and profile equal to those of the cartridge body so as to be closely coupled with the top surface of the edge perpendicular wall of the cartridge body.

According to the present invention, the edible film cartridge receives, stores, and transports the edible film tape, wound in a roll form, in a sealed state, and is mounted in a dispenser body when used, so that it can prevent the edible film, which is vulnerable to moisture, from being damaged by moisture or from being contaminated by foreign materials or microorganisms.

Further, the edible film cartridge receives the edible film tape having the main bobbin and the take-up bobbin, and discharges only the edible tape, separated from the edible film tape, out of the edible film cartridge, so that the work of setting the edible film tape is completed when the edible film cartridge is mounted in the dispenser body, and easy maintenance and easy use by an unskilled person are possible.

In addition, the edible film cartridge has a separating pin, receives the edible film tape having edible tapes pre-cut to a constant length wound in a double tape form, and is mounted in the dispenser body when used, so that it can simplify the driver unit of the dispenser body, eliminate the cutter unit and the encoder unit, and thus remarkably lower the cost of a product.

BRIEF DESCRIPTION OF THE DRAWINGS

FIG. 1 is a sectional view illustrating a related edible film dispenser;

FIG. 2 is a disassembled perspective view illustrating an edible film cartridge according to an embodiment of the present invention;

FIG. 3 is a perspective view illustrating an edible film dispenser in which an edible film cartridge according to an embodiment of the present invention is mounted;

FIG. 4 is a disassembled perspective view illustrating the internal construction of the dispenser body illustrated in FIG. 3;

FIG. 5 is an assembled perspective view illustrating the structure of the dispenser body illustrated in FIG. 3;

FIG. 6 is a perspective view illustrating the state in which an edible film cartridge according to an embodiment of the present invention is mounted on a dispenser body;

FIG. 7 is an enlarged view of a part of FIG. 3, and is a disassembled perspective view illustrating the structure of the fixing pin installed on the vertical partition illustrated in FIG. 3;

FIG. 8 is a disassembled perspective view illustrating an example of the cutter unit illustrated in FIG. 3;

FIG. 9 is a side view illustrating the state in which an edible film cartridge according to an embodiment of the present invention is mounted on the dispenser body illustrated in FIG. 3;

FIG. 10 is a disassembled perspective view illustrating an edible film cartridge according to another embodiment of the present invention;

FIG. 11 is an assembled perspective view illustrating the internal structure of a dispenser body on which an edible film cartridge according to another embodiment of the present invention is mounted;

FIG. 12 is a perspective view illustrating the state in which an edible film cartridge according to another embodiment of the present invention is mounted on a dispenser body; and FIG. 13 is a side view illustrating the state in which an edible film cartridge according to another embodiment of the present invention is mounted on a dispenser body.

<Description Of Symbols Of Main Parts In Drawings>
1: edible film dispenser
10: dispenser body
20: vertical partition
26: inner cover
30: driver unit
32: driving motor
34: draw shaft fixing pin
36: take-up shaft fixing pin
37: draw rotary shaft
38: take-up rotary shaft
74: delivery slit
76: operational switch
78: guide passage
85: cutter unit
91: control switch
96: encoder roller
100: edible film cartridge
102: edible film tape
102a: edible tape
102b: release paper tape
102c: cut edible tape
104: main bobbin
105: take-up bobbin
110: sealing guide member
130: cartridge body
131: draw slit
132: main shaft
134: draw shaft
136: take-up shaft
164: draw roller
165: tension roller
166: tension piece
170: cartridge cover

DETAILED DESCRIPTION

Hereinafter, a cartridge for an edible film dispenser according to an exemplary embodiment of the present invention will be described in detail with reference to the accompanying drawings.

First, FIG. 2 is a disassembled perspective view illustrating an edible film cartridge according to an embodiment of the present invention. FIG. 3 is a perspective view illustrating an edible film dispenser in which an edible film cartridge according to an embodiment of the present invention is mounted. FIG. 4 is a disassembled perspective view illustrating the internal construction of the dispenser body illustrated in FIG. 3. FIG. 5 is an assembled perspective view illustrating the structure of the dispenser body illustrated in FIG. 3. FIG. 6 is a perspective view illustrating the state in which an edible film cartridge according to an embodiment of the present invention is mounted on a dispenser body. FIG. 7 is an enlarged view of a part of FIG. 3, and in particular is a disassembled perspective view illustrating the structure of the fixing pin installed on the vertical partition illustrated in FIG. 3. FIG. 8 is a disassembled perspective view illustrating an example of the cutter unit illustrated in FIG. 3.

As illustrated, a cartridge for dispensing an edible film (hereinafter, referred to as "edible film cartridge") according to an embodiment of the present invention is removably mounted in a dispenser body 10. More particularly, as illustrated in FIG. 2, the edible film cartridge 100 holds an edible film tape 102 in which edible tape 102a and release paper tape 102b are adhered to each other in the form of double tape and are wound in the form of a roll, and comprises a draw roller 164 that discharges the edible tape 102a held therein, and a take-up bobbin 105 around which the release paper tape 102b separated from the edible film tape 102 is wound.

As illustrated in FIG. 3, an edible film dispenser 1 on which the edible film cartridge 100 according to an embodiment of the present invention is mounted (hereinafter, referred to as "edible film dispenser") has an upright orientation, a minimized bottom area, and a compact structure. Further, the dispenser body 10 is provided therein with a mounting space for mounting the edible film cartridge 100, and a driver unit 30 for drawing the edible film tape 102 from the edible film cartridge 100. Thus, the edible film cartridge 100 according to an embodiment of the present invention is vertically mounted in the edible film dispenser 1, and is set so as to discharge the edible film tape 102 in conjunction with the driver unit 30 when mounted.

As illustrated in FIG. 4, the dispenser body 10 has a vertical partition 20 installed vertically in the middle of a bottom plate 14. The mounting spaces for the edible film cartridge 100 are formed on both sides of the vertical partition 20. Further, the driver unit 30, drawing out the edible film tape 102 in conjunction with the edible film cartridge 100, is installed in each mounting space on the sides of the vertical partition 20.

The edible film cartridge 100 according to an embodiment of the present invention will be described in greater detail with reference to FIG. 2 again. The edible film cartridge 100 generally comprises a cartridge body 130 that has an edge perpendicular wall 135 formed along an edge at a predetermined height so as to define a receiving space into which the edible film tape 102, wound in the roll form, is received, and a cartridge cover 170 that is closely coupled to the top surface of the edge perpendicular wall 135 formed along the edge of the cartridge body 130 and seals off the receiving space of the cartridge body 130.

The cartridge body 130 has the overall form of a low case, and comprises a body plate 133 having the form of a plate having a predetermined size and profile, and the edge perpendicular wall 135, which is integrally and vertically formed along the edge of the body plate 133. An inner surface of the body plate 133 is integrally formed with the cylindrical main shaft 132, draw shaft 134, and take-up shaft 136, all of which are spaced apart from each other and will be described below.

A main bobbin 104, around which the edible film tape 102 is wound in a roll form, is rotatably fitted around the main shaft 132. The draw roller 164, drawing the edible tape 102a from the edible film tape 102, is rotatably fitted around the draw shaft 134. A take-up bobbin 105, around which the release paper tape 102b separated from the edible film tape 102 is wound, is rotatably fitted around the take-up shaft 136.

As illustrated, the main shaft 132 is located below the draw shaft 134 and take-up shaft 136 such that the cartridge body 130 stands in an upright orientation, and such that the respective parts are installed compactly. The draw shaft 134 and take-up shaft 136 are provided, at the centers thereof, with through-holes, into which rotary shafts 37 and 38 of the cartridge body 130, which will be described below, can be inserted. Further, the cartridge body 130 can be integrally formed with a plurality of fastening bosses 138 for fastening the cartridge cover 170.

The edge perpendicular wall 135 of the cartridge body 130 is provided with a draw slit 131 having a predetermined gap such that the edible tape 102*a*, drawn out by the draw roller 164, is discharged. Preferably, in order to facilitate mounting the edible film cartridge 100 or setting the edible tape 102*a*, the upper or lower side of the draw slit 131 has an open space within a predetermined area. In addition, the top surface of the edge perpendicular wall 135 may be preferably provided with a step 137, to which the cartridge cover 170 is closely coupled.

As another example, the top surface of the edge perpendicular wall 135 can be provided with a flange 139 (FIG. 10), which widens the area of contact with the bottom surface of the cartridge cover 170 or is closely coupled with a hooking step (not shown) on an edge of the cartridge cover 170. The step 137 and the flange 139 may be additionally provided with sealing members, each of which is made of a soft material such as silicon. Further, the draw slit 131 may be additionally provided with a sealing guide member 110 (FIG. 10), which is made of a soft material such as silicon. The sealing guide member 110 serves not only to smoothly guide the drawing of the edible tape 102*a* but also to prevent moisture from being introduced through the draw slit 131.

Next, the cartridge cover 170 is a plate member having the same size and profile as the body plate 133. The inner surface of cartridge cover 170 is integrally formed with a cover draw shaft 174 and a cover take-up shaft 176, which correspond to the draw shaft 134 and take-up shaft 136 formed on the body plate 133. In this case, the draw roller 164 is installed on the draw shaft 134 at one end thereof, and is rotatably installed on the cover draw shaft 174 at the other end thereof. The take-up bobbin 105 is installed on the take-up shaft 136 at one end thereof, and is rotatably installed on the cover take-up shaft 176 at the other end thereof. At this time, the take-up shaft 136 and cover take-up shaft 176 are formed so as to be relatively short, and free ends thereof are spaced apart from each other by a predetermined distance, so that the outer circumference of the take-up rotary shaft 38 is in contact with the inner circumference of the take-up bobbin 105.

Further, the cartridge cover 170 is provided with a plurality of fastening holes 178 that correspond to the plurality of fastening bosses 138 formed on the body plate 133. The cartridge cover 170 can be coupled to the body plate 133 by fastening the fastening bosses 138 using fastening screws 174. The flange 139 of the edge perpendicular wall 135 and the edge of the cartridge cover 170 may be coupled by radio frequency heat fusion or by adhesion with an adhesive. Alternatively, the flange 139 of the edge perpendicular wall 135 and the edge of the cartridge cover 170 may be coupled using at least one clamp.

In the edible film cartridge 100, configured in this way, according to an embodiment of the present invention, first, the main bobbin 104, around which the edible film tape 102 is wound, is rotatably coupled to the main shaft 132 formed on the body plate 133 of the cartridge body 130, and the take-up bobbin 105, around which the release paper tape 102*b* separated from the edible film tape 102 is wound, is rotatably coupled to the take-up shaft 136. Then, the edible tape 102*a* separated from the edible film tape 102 is brought into close contact with the outer circumference of the draw roller 164, which is rotatably installed on the draw shaft 134, and the leading end of the edible tape 102*a* is inserted through the draw slit 131 of the edge perpendicular wall 135. Thereby, the work of setting the edible tape 102*a* is completed.

As described above, the work of setting the edible tape according to the present invention is not required to be performed by a user such as an owner or employee of a restaurant, because the edible tape is set and supplied in the factory, where the edible film cartridge 100 is assembled by a skilled worker.

Meanwhile, a tension roller 165 or a tension piece 166 (FIG. 9) is installed below the draw roller 164. Thus, the edible tape 102*a* is closely inserted between the draw roller 164 and the tension roller 165. The tension roller 165 is a kind of idle roller, is installed adjacent to the draw roller 164, and is surrounded with an elastic material on the outer circumference thereof. Accordingly, when the draw roller 164 rotates with the edible tape 102*a* interposed closely between the draw roller 164 and the tension roller 165, the edible tape 102*a* is drawn out in the rotation direction.

Further, because the space between the draw roller 164 and the tension roller 165 and the space above the draw slit 131 are in an open state until the cartridge cover 170 is coupled to the cartridge body 130, the edible tape 102*a* can be easily inserted in a manner such that it is pushed upwards from below. Then, the cartridge cover 170 is closed on the cartridge body 130, and is then fastened using the plurality of fastening screws 174. Thereby, the edible film cartridge 100 of the present invention is assembled.

Further, in the case in which the edible film cartridge 100 is stored for a long time and is transported, the through-holes of the draw slit 131, draw shaft 134, and take-up shaft 136 can be adhered using a separate sealing tape. In this manner, the adhesion of the sealing tape can prevent moisture from being introduced into the edible film cartridge. Thus, the edible film cartridge 100 according to an embodiment of the present invention is stored or distributed in the sealed state, so that the edible film can be prevented from being damaged by moisture or contaminated by foreign material or microorganisms.

Meanwhile, the take-up bobbin 105 of the edible film cartridge 100 according to an embodiment of the present invention is integrally formed with an elastic key 39 (FIG. 9) in an inward direction thereof. Thus, the elastic key 39 is integrally coupled to the take-up bobbin 105 at one side thereof, and protrudes, as a free end, toward the hollow part of the take-up bobbin 105 at the other side thereof. Then, when the take-up rotary shaft 38 is inserted into the hollow part of the take-up bobbin 105, the elastic key 39 connects the take-up bobbin 105 and the take-up rotary shaft 38 with a predetermined elastic force. Thus, when the take-up rotary shaft 38 coupled with the take-up bobbin 105 is rotated, the take-up rotary shaft 38 rotates the take-up bobbin 105 within the limit of the elastic force of the elastic key 39. However, in the event that a load is applied to the take-up rotary shaft 38 beyond the a limit of the elastic force of the elastic key 39, the take-up rotary shaft 38 runs idle, and thus the take-up bobbin 105 no longer winds the release paper tape 102*b*. In this manner, the present invention is adapted to prevent the take-up bobbin 105 from directly winding the edible film tape 102 using the relatively weak elastic force of the elastic key 39, and to allow the take-up bobbin 105 to passively wind only the release paper tape 102*b* separated from the edible film drawn out by the draw roller 164, so that the edible tape 102*a* can be drawn out smoothly at a constant speed regardless of a change in the diameter of the take-up bobbin 105.

Now, the structure of the dispenser body 10 according to the present invention will be described in detail with reference to FIGS. 3 and 6.

First, the dispenser body 10 according to the present invention comprises the bottom plate 14 having a relatively narrow area, front and rear plates 12 and 13, which are vertically installed on the top surface of the bottom plate 14, and right and left plates 15 and 16 which are detachably coupled to the top surface of the bottom plate 14 and sides of the front and rear plates 12 and 13. At this time, the front and rear plates 12 and 13 are coupled with the upper ends thereof touching each other because the upper portions thereof are bent in directions facing each other. As such, a separate top plate is not required.

Meanwhile, the right and left plates 15 and 16 are separated from the dispenser body, and then the above-described edible film cartridge 100 according to an embodiment of the present invention is mounted in an inner space between the separated right and left plates 15 and 16. When the edible film cartridge 100 is mounted, the right and left plates 15 and 16 are coupled to prevent moisture or foreign materials from being introduced. At this time, each of the right and left plates 15 and 16 is provided with at least one elastic hook 62 in an upper portion thereof, and is integrally formed with at least one horizontal rib 63 in a lower portion thereof. Further, each of the right and left plates 15 and 16 is provided with a grip 64 on the outer surface thereof, into which fingers can be inserted. Thus, the horizontal ribs 63 are inserted into slide clamping recesses 83 formed on the bottom plate 14, and the elastic hooks 62 are elastically engaged with hooked parts 82 formed on the front and rear plates 12 and 13, so that the right and left plates 15 and 16 are removably coupled to each other.

Then, the front plate 12 is integrally formed with a protrusion 72. The protrusion 72 is provided with two delivery slits 74, through which the edible film is delivered, on the top surface thereof. Two operation switches 76 are installed in front of the delivery slits 74 so as to correspond to the delivery slits 74. Thus, when any one of the operation switches 76 is pushed down, the edible film is discharged from the corresponding delivery slit 74. Further, although not illustrated, the front plate 12 may be provided with a billboard or signboard which shows the type, usage, etc. of the edible film or an unrelated advertisement.

The vertical partition 20 of the dispenser body 10 is a plate member having a size and profile capable of dividing the inner space of the dispenser body 10 into two inner spaces, and is fixed using a support plate 300 installed on the bottom plate 14. The support plate 300 has two L-shaped plates spaced apart by a predetermined distance, and the lower end of the vertical partition 20 is inserted and fixed between the two L-shaped plates. At this time, the support plate 300 and the vertical partition 20 are fastened using a plurality of fastening screws 301.

Further, the bottom plate 14 is provided with seats 41, on each of which the edible film cartridge 100 is seated. Each seat 41 is recessed so as match the form of the bottom surface of the edible film cartridge 100. In this manner, because the seats 41 are formed on both sides of the vertical partition 20, the edible film cartridge 100 can be mounted on each side of the vertical partition 20. Because the dispenser body 10 according to the present invention can mount two edible film cartridges 100 using the vertical partition 20 at the same time, the edible film tape need not be frequently replaced, and the dispenser body 10 can be reduced in size and made compact.

Further, the vertical partition 20 is provided with the driver units 30, each of which functions to drive the draw roller 164 and take-up bobbin 105 of the edible film cartridge 100. As illustrated in FIG. 4, the driver units 30 are installed on both sides of the vertical partition 20. However, for the convenience of description, only one driver unit will be described herein. The other driver unit is merely installed at a different position, but otherwise has the same configuration. Thus, a person skilled in the art can easily understand this configuration.

The driver unit 30 comprises a driving motor 32, which is installed in the rear of the vertical partition 20, a draw shaft fixing pin 34 and take-up shaft fixing pin 36, which are fixed so as to be perpendicular to the vertical partition 20, the draw rotary shaft 37, which is rotatably fitted around the draw shaft fixing pin 34 and has a driven pulley 47 installed on the outer circumference thereof, the take-up rotary shaft 38, which is rotatably fitted around the take-up shaft fixing pin 36 and has a driving pulley 48 and gear 33 installed on the outer circumference thereof, an annular belt 45, which is connected between the driven pulley 47 and the driving pulley 48, and a worm gear 31, which is integrally formed on the leading end of a driving shaft of the driving motor 32 and is engaged with the gear 33 formed on the outer circumference of the take-up rotary shaft 38.

The vertical partition 20 is provided with two cutout parts 22, in which the two driving motors 32 are installed. The driving motor 32 installed in the cutout parts 22 is firmly fixed by separate brackets 24.

As illustrated in FIG. 7, the draw shaft fixing pin 34 and take-up shaft fixing pin 36 include bolt-type fixing shafts 34' and 36' having bolt parts 52, and nut-type fixing shafts 34 and 36 having nut parts 53. Thus, when the bolt parts 52 of the bolt-type fixing shafts 34' and 36' pass through through-holes 54 drilled in a vertical partition 20, and then are fastened into the nut parts 53 of the nut-type fixing shafts 34 and 36, the draw shaft fixing pin 34 and take-up shaft fixing pin 36 are installed on both sides of the vertical partition 20. At this time, the draw shaft fixing pin 34 is provided with an annular spacer 55, and the take-up shaft fixing pin 36 is provided with a fixing member 56 at a free end thereof.

Meanwhile, referring to FIGS. 4 and 5, the vertical partition 20 is covered, on both sides thereof, with inner covers 26, each of which is adapted to cover the driver unit 30 and cause the edible film cartridge 100 to be closely mounted on the outer surface of each inner cover. Each inner cover 26 is provided with a perpendicular wall along the edge thereof so as to define a predetermined space therein, and two through-holes 27 and 28 in the upper portion thereof, such that the draw rotary shaft 37 and take-up rotary shaft 38 protrude to a predetermined length. Further, preferably, each inner cover 26 is provided with a rear opening at the rear thereof so as to not only easily install the driving motor 32 but also be favorable for heat radiation etc., and a front opening at the front thereof, so as to distribute electric wires or signal lines. Each inner cover 26 is fixed to the vertical partition 20 by a plurality of fastening screws 29.

Referring to FIG. 4, two cutter units 85 for cutting the edible tapes 102a drawn out of the edible film cartridges 100 are installed at an incline below the delivery slits 74 of the front plate 12. As illustrated in FIG. 8, each cutter unit 85 comprises a base 87 having a through-slit 86, through which the edible tape 102a passes, a knife 88, which is installed to be movable along the base 86 so as to cut the edible tape 102a inserted into the through-slit 86, a solenoid actuator 89, which moves the knife 88 in a forward (or backward) direction, a coil spring 84, which returns the knife 88, and a coupling member for coupling these parts.

In the present invention, each cutter unit 85 preferably employs the solenoid actuator 89, which moves linearly, but it may be composed of a separate rotating motor and a transmission for converting the rotary motion of the rotating motor into linear motion. This cutter unit 85 can be easily implemented by a person skilled in the art, and so a detailed description thereof will be omitted herein.

As illustrated in FIG. 5, the vertical partition 20 is provided with a control switch 91 for controlling the cutter unit 85, and an encoder roller 96 that rotates along the belt 45, which runs between the driving pulley 48 and the driven pulley 47 and mechanically contacts the control switch 91 in proportion to the travel distance of the belt 45. At this time, the encoder roller 96 periodically turns on the control switch 91 in correspondence with the travel distance of the belt 45.

The control switch 91 includes a connector 92, which is in elastic contact with an inner switch, and thus is mechanically connected with a contact arm 97 of the encoder roller 96. The encoder roller 96 is installed adjacent to the belt 45 so as to be able to apply tension to the belt 45, and accurately rotates in proportion to the travel distance of the belt 45. The contact arm 97 is integrally formed with the encoder roller 96, and thereby periodically comes into contact with the connector 92 of the control switch 91 as the encoder roller 96 rotates.

Preferably, the encoder roller 96 has a diameter that depends on the length of the cut piece of edible tape 102c dispensed by the edible film dispenser 1. For example, the circumferential length of the encoder roller 96 is equal to the length of the cut edible tape. Therefore, when the encoder roller 96 rotates in synchronization with the movement of the belt 45, the contact arm 97 comes into contact with the connector 92 of the control switch 91 every time the encoder roller 96 makes a complete rotation, thereby operating the cutter unit 85. Thus, the edible tape 102a is cut by the circumferential length of the encoder roller 96 (or the travel distance of the belt 45). In this manner, because the edible tape 102a is cut in proportion to the travel distance of the belt 45, the present invention can always provide the cut edible tape 102c at a constant length irrespective of a change in the diameter of the roll-shaped edible film tape 102. Further, the present invention does not use expensive sensors.

Hereinafter, a method of mounting the edible film cartridge 100 of the present invention on the dispenser body 10, and the operation of the resulting edible film dispenser 1 will be described.

First, in order to mount the edible film cartridge 100 on the dispenser body 10, the right and left plates 15 and 16 are separated from the dispenser body 10. The edible film cartridge 100 is seated on the seat 41 so as to be brought into close contact with the vertical partition 20. Then, as illustrated in FIGS. 6 and 9, the draw rotary shaft 37 and take-up rotary shaft 38, which protrude from the vertical partition 20, are coupled with the draw roller 164 and take-up bobbin 105 of the edible film cartridge 100 through the through-holes formed in the side of the edible film cartridge 100. The leading end of the edible tape 102a exposed through the draw slit 131 passes through the through-slit 86 of the cutter unit 85 installed on the dispenser body 10, and then is suspended. Then, the separated right and left plates 15 and 16 are again coupled. As a result, the mounting of the edible film cartridge 100 is completed.

In this manner, the edible film cartridge 100 of the present invention can be very simply mounted. Further, because the edible tape 102a is set when the mounting of the edible film cartridge 100 is completed, an unskilled person can rapidly replace, mount or set the edible film cartridge 100.

In the state in which the edible film cartridge 100 is in close contact with the vertical partition 20, a user pushes the operation switch 76. Then, the corresponding driving motor 32 is driven to rotate the take-up rotary shaft 38, coupled through the transmission, and the take-up bobbin 105 of the edible film cartridge 100 is rotated to wind the release paper tape 102b within the limit of the elastic force of the elastic key 39, which is formed on the take-up bobbin 105. At this time, the draw rotary shaft 37, connected with the take-up rotary shaft 38 through the belt 45, is rotated, and thus the draw roller 164 in the edible film cartridge 100 is rotated to thus draw out the edible tape 102a. Meanwhile, the take-up rotary shaft 38 has a rotational force higher than the draw rotary shaft 37 by about 10%, but it runs idle due to the elastic key 39 when a load exceeding a predetermined value is applied. Thus, the edible film tape 102 is substantially drawn out by the draw roller 164, and the take-up rotary shaft 38 causes only the release paper tape 102b, which has already been separated and bears almost no load, to be wound around the take-up bobbin 105.

Further, the encoder roller 96, rotating in correspondence with the travel distance of the belt 45, operates the cutter unit 85 through periodic connection with the control switch 91, and thus the cutter unit 85 cuts the drawn edible tape 102a to a constant length. The cut edible tape 102c, which is cut to a constant length, is discharged through the delivery slit 74 of the front plate 12, and thus the user extracts and uses the cut edible product. In this state, when the user pushes another operation switch 76 installed on the front plate 12, another driving motor is driven in the same fashion, and thus supplies another cut edible tape 102c, which is cut to a constant length, through another delivery slit 74.

The operation of the driver unit 30 of the dispenser body 10 will be described in greater detail. When the driving motor 32 is driven in response to input from a user, the rotational force of the driving motor 32 is transmitted to the take-up rotary shaft 38 by the gear 33 engaged with the worm gear 31 of the driving shaft of the driving motor 32. At the same time, the rotational force of the take-up rotary shaft 38 is transmitted to the draw rotary shaft 37 through the belt 45, connected between the driving pulley 48 and the driven pulley 47.

At this time, as illustrated in FIG. 9, the draw roller 164 and take-up bobbin 105 of the edible film cartridge 100 are coupled to the draw rotary shaft 37 and take-up rotary shaft 38. Thus, when the draw roller 164 is rotated, the edible tape 102a, which is kept in close contact with the outer circumference of the draw roller by the tension piece 166 (or tension roller), is drawn out in the direction in which the draw roller is rotated. Further, the take-up bobbin 105 winds the release paper tape 102b in the rotation direction. Thus, the edible tape 102a and release paper tape 102b are separated from each other.

In the event that a load exceeding a predetermined value is applied to the elastic key 39 between the take-up bobbin 105 and the take-up rotary shaft 38, the take-up rotary shaft 38 is decoupled from the take-up bobbin 105, and thus runs idle. Thus, the edible tape 102a is prevented from being pulled toward the take-up bobbin 105 and deviating from the path thereof, and the edible film tape 102 is prevented from being wound around the take-up bobbin 105 by the continuous change in the diameter of the roll thereof.

Now, the edible film cartridge according to another embodiment of the present invention will be described with reference to FIGS. 10 through 13. In the drawings, the same parts as those of the above-described embodiment are assigned the same reference numbers, and so a detailed description thereof will be omitted.

First, FIG. 10 is a disassembled perspective view illustrating a cartridge 100 for dispensing edible film (hereinafter, referred to as "edible film cartridge") according to another embodiment of the present invention. FIG. 11 is an assembled perspective view illustrating the internal structure of a dispenser body 10 according to another embodiment of the present invention. FIG. 12 is a perspective view illustrating the state in which an edible film cartridge 100 according to another embodiment of the present invention is mounted on a dispenser body 10. FIG. 13 is a side view illustrating the state in which an edible film cartridge according to another embodiment of the present invention is mounted on a dispenser body.

As illustrated, the edible film cartridge 100 according to another embodiment of the present invention comprises a cartridge body 130 that has a receiving space for receiving an edible film tape 102 wound in the form of a roll, and an a cartridge cover 170 that seals off the receiving space of the cartridge body 130. The cartridge body 130 and cartridge cover 170 are plastic injection moldings. The cartridge body 130 is integrally formed with an edge perpendicular wall 135 at an edge thereof. The edge perpendicular wall 135 is integrally formed with a flange 139 having a predetermined width at the top surface thereof. The edge perpendicular wall 135 is provided with a draw slit 131 having a predetermined width such that the edible tape 102a can be drawn out.

Further, the draw slit 131 is preferably provided with a sealing guide member 110, which is made of a soft material such as silicon. The sealing guide member 110 is an injection molding, and is provided with a passage 113 through which the edible tape 102a is drawn out and which passes though the middle portion thereof, and fitting recesses 115, into which the edge perpendicular wall 135 having the draw slit 131 are fitted, on opposite sides thereof. The sealing guide member 110 is fitted into the draw slit 131, so that it serves not only to smoothly guide the drawing of the edible tape 102a but also prevent moisture from being introduced through the draw slit 131.

The edible film tape 102 received into the edible film cartridge 100 according to another embodiment of the present invention has the form of a double tape consisting of an edible tape 102a and a release paper tape 102b, wherein the edible tape 102a is cut to a constant length in advance in the factory. Preferably, in the edible film tape 102, the edible tape 102a is adhered to the release paper tape 102b, the edible tape 102a is cut, and then the edible tape 102a is wound around a main bobbin 104. In the drawings, reference number 101 indicates a pre-cut line. Therefore, as described below, the edible tape 102a does not require a separate cutting device or work.

The cartridge body 130 comprises a body plate 133, which is integrally formed with the edge perpendicular wall 135 along the edge thereof, and thus defines the receiving space. The body plate 133 is integrally formed, on the inner surface thereof, with a cylindrical main shaft 132 to which the main bobbin 104 is rotatably coupled, and a cylindrical take-up shaft 136 to which the take-up bobbin 105 is rotatably coupled, wherein the main shaft 132 and take-up shaft 136 are spaced apart from each other by a predetermined distance. The main shaft 132 and take-up shaft 136 have the form of a cylinder, and the take-up shaft 136 is provided with a though-hole at the center thereof such that a take-up rotary shaft 38 is inserted. Further, a separating pin 192 for separating the edible tape 102 from the release paper tape 102b, i.e. for separating the cut edible tape 102c, which is pre-cut to a constant length, from the release paper tape 102b, is installed in the upper space between the main shaft 132 and the take-up shaft 136.

The separating pin 192 is installed on a body plate 133 so as to be perpendicular to the body plate 133, and is a cylindrical fixing pin which is longer than the width of the edible film tape 102. The separating pin 192 is preferably provided with a horizontal cutting face 193 in a lengthwise direction in order to form an edge for facilitating the separation of the cut edible tape 102c. Meanwhile, the cartridge cover 170 is a plate member having the same size and profile as the body plate 133, and can be integrally formed with a cover take-up shaft 176, which corresponds to the take-up shaft 136 formed on the body plate 133, on an inner surface thereof. Further, the cartridge cover 170 may be a simple plate member from which the cover take-up shaft 176 and fastening holes are eliminated. In this case, the cartridge cover 170 is integrally bonded to the flange 139 of the edge perpendicular wall 135 by radio frequency heat fusion or adhesion with an adhesive.

In this edible film cartridge 100 according to another embodiment of the present invention, the cut edible tape 102c, which is pre-cut to a constant length, is wound, and the separating pin 192 for separating the cut edible tape 102c from the release paper tape 102b is mounted. The dispenser body 10, on which the edible film cartridge 100 according to another embodiment of the present invention is mounted, does not require a cutter unit for cutting the edible tape 102a, an encoder roller for measuring the cut length of the edible tape 102a, or a control switch. As such, the dispenser body 10 of the present invention has a simple structure, and enables easy maintenance even by an unskilled person, because the setting of the edible film tape 102 is easy, and because failure seldom occurs.

Hereinafter, a procedure of mounting the edible film cartridge 100 according to another embodiment of the present invention on the dispenser body 10 and the operation of the resulting dispenser body will be described.

First, referring to FIGS. 11 and 12, the right and left plates 15 and 16 are separated from the dispenser body 10. The edible film cartridge 100 is mounted so as to be brought into close contact with the vertical partition 20. Then, the take-up rotary shaft 38, which protrudes from the vertical partition 20, is coupled to the take-up bobbin 105 of the edible film cartridge 100 through the through-hole formed in the side of the edible film cartridge 100. The edible tape 102a, which is exposed at the leading end thereof through the draw slit 131 and is pre-cut to a constant length, is located at the entrance of the delivery slit 74. At this time, the delivery slit 74 preferably has a guide passage 78, which guides the cut edible tape 102c, extending up to the proximity of the separating pin 192. Then, the separated right and left plates 15 and 16 are coupled to the dispenser body 10. As a result, the mounting of the edible film cartridge 100 is completed.

As illustrated in FIG. 13, in the state in which the edible film cartridge 100 is mounted in close contact with the vertical partition 20, the driving motor 32 is driven when the user selects and pushes the operation switch 76, and the gear 33 engaged with the worm gear 31 of the driving shaft of the driving motor 32 is rotated. Thereby, the take-up rotary shaft 38 is rotated. Thus, the take-up bobbin 105, coupled to the take-up rotary shaft 38, is rotated, and the edible film tape 102 is wound in the rotation direction.

At this time, the edible film tape 102 drawn out by the take-up bobbin 105 is adapted so that the cut edible tape 102c is separated from the release paper tape 102b by sharply bending the release paper tape 102b at the edge of the horizontal cutting face 193 formed on the separating pin 192. The separated edible tape 102c is dispensed along the guide passage 78 extending from the through-slit 86 formed on the front plate 12.

In this edible film dispenser 1 according to another embodiment of the present invention, the edible film tape 102 having the edible tape 102a pre-cut to a constant length is received in the edible film cartridge 100 having the separating pin 192, and the edible film cartridge 100 is mounted on the vertical partition 20, on which the driver unit 30 is installed, so that the edible film tape 102 is easily set. Further, the cutter unit and encoder roller for cutting the edible tape 102a and the draw roller are not required, and thus the edible film dispenser has a simple, compact structure, can be installed in a small space in the restaurant, and can be easily maintained by an unskilled person.

In addition, the cartridge type edible film dispenser 1 of the present invention additionally has a small lamp 199, such as a light emitting diode (LED), installed in the dispenser body 10, preferably at the upper portion of the front plate 12. Thereby, the heat emitted from the small lamp 199 can discharge the moisture in the dispenser body 10, or prevent moisture from being introduced from the outside.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An edible film cartridge mounted in an edible film dispenser, wherein the edible film dispenser comprises a driver unit and rotary shaft rotated by the driver unit, the edible film cartridge comprising:
  (a) a cartridge body formed with an edge perpendicular wall along the edge of a body plate; and a plate-shaped cartridge cover closely coupled with a top surface of the edge perpendicular wall of the cartridge body, wherein the edge perpendicular wall of the cartridge body is in a sealed state , wherein the edge perpendicular wall defines a draw slit formed on one side of the top surface to draw out an edible film such that a receiving space is formed in the edible film cartridge:
  (b) an edible film tape contained within the receiving space defined by the edible film cartridge wherein the edible film tape is cut to a predetermined length and is adhered on a surface of a release paper tape, a cylindrical main bobbin, around which the edible film tape is wound in a roll form, and a cylindrical take-up bobbin around which the release paper tape separated from the edible film tape is wound in a roll form,
  (c) the body plate of the cartridge body is integrally formed with a main shaft to which the main bobbin is rotatably coupled, a take-up shaft to which the take-up bobbin is rotatably coupled, and a draw shaft separating the edible tape from the edible film tape,
  (d) the main shaft is formed in the center of a lower end of the cartridge body, the take-up shaft is on the main shaft to be spaced a predetermined distance therefrom, the draw shaft is formed to be adjacent to the draw slit such that a forward direction of the edible film tape provided from the main bobbin to be transmitted to the take-up bobbin is changed, and the edible tape is separated from the release paper tape to draw out the separated edible tape,
  (e) the center of the take-up shaft includes a through hole to which the rotary shaft rotated by the driver unit formed in the edible film dispenser is inserted, and the take-up shaft is in close contact with the take-up bobbin to prevent external moisture from being introduced into the edible film cartridge through the through hole, so that the edible film is prevented from being damaged by the moisture,
  (f) when the edible film cartridge is installed in the edible film dispenser, the rotary shaft of the edible film dispenser is inserted into the through hole of the edible film cartridge, and the rotary shaft inserted into the through hole is coupled to rotate the take-up bobbin, and
  (g) when the take-up bobbin is rotated by the driver unit, the release paper tape of the edible film tape wound around the main bobbin is wound around the take-up bobbin via the draw shaft, and the edible film adhered to the release paper tape is separated from the release paper tape to be discharged one at a time through the draw slit.

2. The edible film cartridge according to claim 1, wherein: the cartridge body includes any one of a tension roller and a tension piece, wherein the tension piece is installed adjacent to the draw roller and presses the edible tape, wherein the edible tape is located on an outer circumference of the draw roller, such that the draw roller is brought into close contact with the edible tape; and each of the draw shaft and the take-up shaft has a through-hole in a center thereof for insertion of a rotary shaft of the edible film dispenser.

3. The edible film cartridge according to claim 1, wherein the take-up bobbin includes an elastic key, which is elastically coupled with an outer circumference of the take-up shaft of the edible film dispenser, and which causes the take-up shaft to run idle when a load exceeding a predetermined value is applied.

4. The edible film cartridge according to claim 1, wherein the edge perpendicular wall of the cartridge body includes a flange, which is closely coupled with the cartridge cover, on a top surface thereof.

5. The edible film cartridge according to claim 4, wherein the flange further includes a sealing member.

6. The edible film cartridge according to claim 1, wherein the draw slit further includes a sealing guide member for guiding the drawn edible tape and preventing external moisture from being introduced.

7. The edible film cartridge according to claim 1, wherein the through-hole, formed in the center of the draw shaft or the take-up shaft of the cartridge body, and the draw slit, formed in the edge perpendicular wall, have sealing tapes for preventing external moisture from being introduced.

\* \* \* \* \*